United States Patent [19]

Ross

[11] Patent Number: 5,025,214
[45] Date of Patent: Jun. 18, 1991

[54] CIRCUIT AND PROCESS FOR CONVERTING A HALF BRIDGE TRANSDUCER OUTPUT SIGNAL TO AN LVDT TRANSDUCER OUTPUT SIGNAL

[75] Inventor: Jeffrey A. Ross, Bellbrook, Ohio

[73] Assignee: The Warner & Swasey Company, Cleveland, Ohio

[21] Appl. No.: 542,509

[22] Filed: Jun. 25, 1990

[51] Int. Cl.⁵ .......................... G01B 7/14; G01F 5/14
[52] U.S. Cl. .......................... 324/207.19; 324/207.15; 324/207.24; 323/264
[58] Field of Search ............. 324/207.18, 226, 207.11, 324/207.15, 207.16, 207.19, 207.24; 340/870.36; 323/264, 347

[56] References Cited

U.S. PATENT DOCUMENTS 4,847,548 7/1989 Lafler ................................. 323/264

Primary Examiner—Walter E. Snow
Attorney, Agent, or Firm—John R. Benefiel; Raymond J. Eifler

[57] ABSTRACT

A circuit and a process for converting the output signal from a half bridge transducer to that from an LVDT transducer to enable direct use of either signal in an electronic column. The circuit subtracts the transducer exciting signal from a half bridge transducer output signal according to a formula to provide the conversion. A movable jumper allows the circuit to alternatively operate as a unity gain follower to pass an LVDT transducer output signal unchanged.

6 Claims, 3 Drawing Sheets

CIRCUIT AND PROCESS FOR CONVERTING A HALF BRIDGE TRANSDUCER OUTPUT SIGNAL TO AN LVDT TRANSDUCER OUTPUT SIGNAL

This invention concerns linear variable differential transformer (LVDT) distance transducers and half bridge transducers, in which a gaging plunger is movably mounted so as to be linearly displaced by contact with a portion of part to be gaged. The position of the plunger corresponds to a variable electrical signal output from a transformer excited by an AC signal. The principle of operation is based on the fact that the plunger acts as a transformer core, variably coupling two transformer windings as a function of its linear position to variably modify the output signal. Such devices are in very widespread use in industrial applications for precision gaging of machined parts, particularly in the auto industry.

The transducers in widespread use are of two basic types, the "LVDT" and "half bridge" configurations. In the LVDT configuration, most common in the United States, a primary winding and two secondary windings are employed, while in the half bridge configuration, most common in Europe, only two secondary windings are employed.

In the LVDT configuration, an amplitude and phase change in the output signal occurs as the plunger moves from a full in or positive position, past a null point to a full out or negative position. In the half bridge configuration, only an amplitude change occurs in the output signal as the plunger moves through its full range of displacement.

The output signal is transmitted to processing electronics in a utilization device, such as an electronic column display, and heretofore these devices have been designed to operate exclusively with either the LVDT or half bridge LVDT signal outputs. It would be advantageous if a common output signal mode could be derived from either type of transducer to avoid the need for different designs for such utilization devices.

SUMMARY OF THE INVENTION

The present invention comprises a converter circuit and process which enables conversion of the half bridge output signal to that of an LVDT through the full range of plunger displacement to enable utilization devices designed for use with LVDT transducers to also be directly usable with half bridge transducers.

The half bridge output signal $V_{out}$ is applied to the circuit as $V_{in}$, where the exciting AC signal $V_{ref}$ is subtracted from $V_{in}$ in an operational amplifier, a resistance network associated with the amplifier generating a converted output signal $V_{out}$ (Converted) from the amplifier according to the following formula:

$$V_{out}(Converted) = 2V_{in} - V_{ref} \text{ ps}$$

The converted output signal corresponds exactly to the LVDT output signal for each plunger position to be directly usable with utilization devices designed for LVDT's.

The circuit is able to be preferably reconfigured electrically by a movable jumper to function as a unity gain follower, such that an input from an LVDT transducer will be unchanged by the circuit, thus affording a universal input for the associated utilization device.

DETAILED DESCRIPTION

Figure 1:
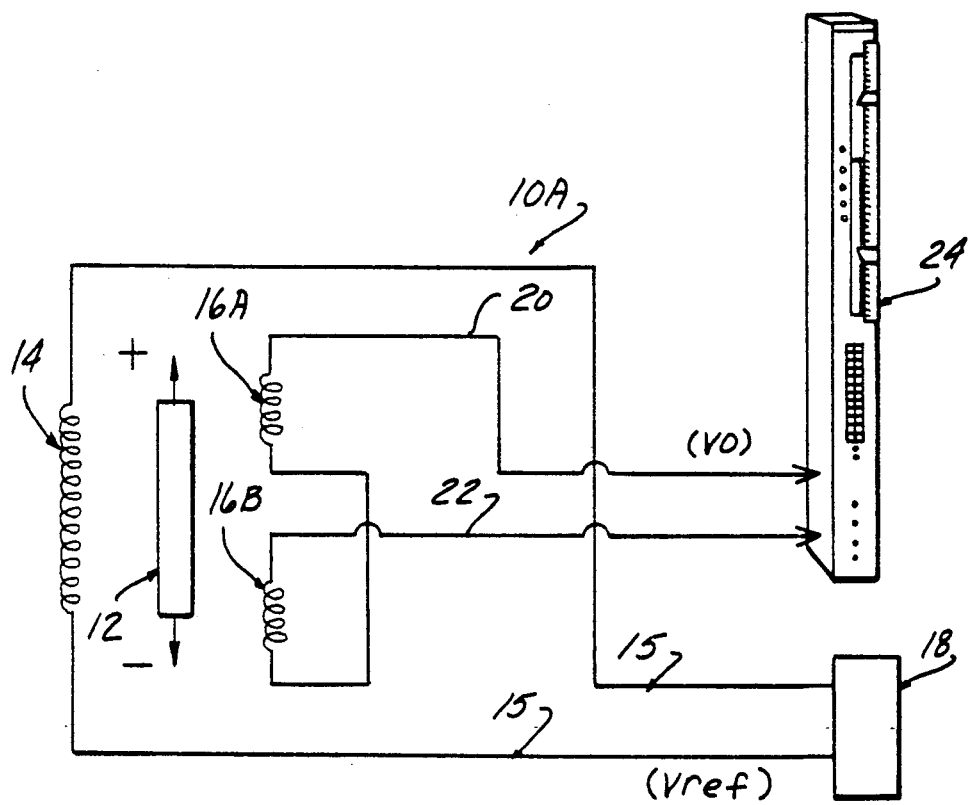
FIG. 1 is a diagram of an LVDT transducer and associated inputs and outputs.

FIGURE 1 depicts an LVDT transducer, in which a movable core or plunger 12 is juxtaposed to a primary winding 14 and a pair of secondary windings 16.

An AC excitation signal from a reference signal source 18 is applied to the primary winding 14 over lines 15, and an output signal is read on lines 20, 22 by a utilization device such as an electronic column 24.

Figure 2:
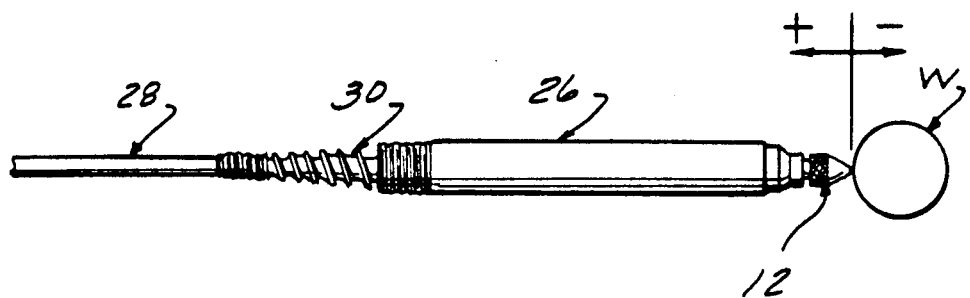
FIGURE 2 is a side view of an LVDT transducer and associated electrical cable.

FIG. 2 shows the plunger 12 movably mounted in a housing 26 to be shifted in correspondence to the surface of a part W to be gaged, input and output signals are carried over lead cable 28, with strain relief 30 fitting supporting the cable 28 at one end of the housing 26.

The plunger 12 is movable linearly from a null or neutral central position to positive and negative extremes in either direction, corresponding to in and out positions of the plunger 12 in the housing 26.

Figure 3:
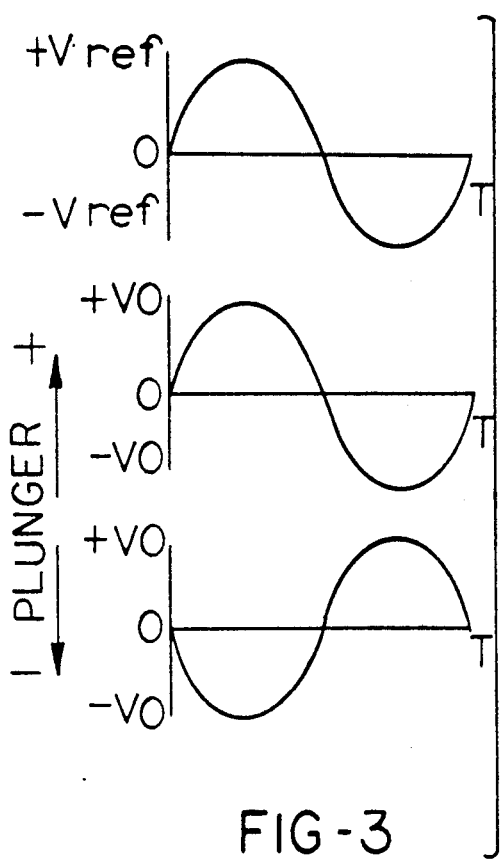
FIGURE 3 is a waveform diagram of an LVDT transducer.

FIG. 3 depicts in the uppermost diagram the reference or AC excitation signal $V_{ref}$, varying sinusoidally from zero to a positive peak, through zero to a negative peak and back to zero. With the plunger 12 at a maximum positive, i.e., in the inmost position, the output signal $V_{out}$ to the electronic column 24 is at a maximum value and in phase with the AC exciting signal $V_{ref}$, but is progressively scaled down in amplitude thereof as the neutral position is approached. The output signal thereafter switches phase 180 degrees, but is progressively scaled up in amplitude as the plunger 12 assumes a more negative, out position, until a maximum amplitude output signal 180 degrees phase shifted from the AC exciting signal is produced when the plunger 12 assumes the full out negative position.

Figure 4:
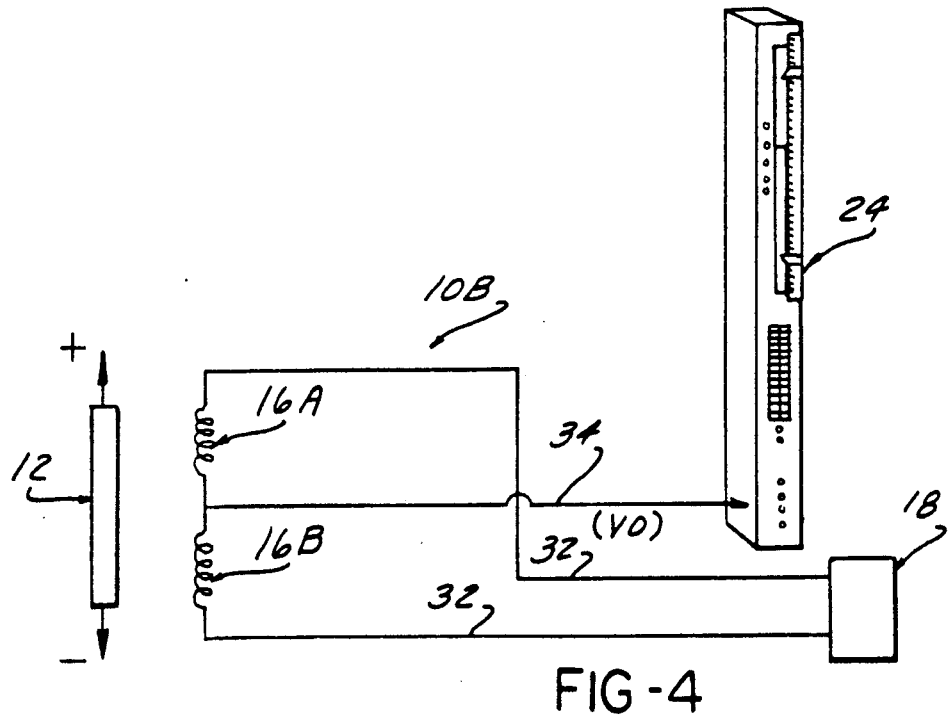
FIGURE 4 is a diagram of a half bridge transducer and associated and outputs.

FIG. 4 shows a so-called "half bridge" transducer 10B in which an in series secondary windings 16A, 16B are incorporated, the plunger 12 movably mounted as in the LVDT transducer configuration. Here the AC exciting signal $V_{ref}$ from source 18 is applied to either side of secondary windings 16A, 16B on lines 32. The output signal is taken from a point intermediate to the secondary windings 16A, 16B over the single lead 34 and transmitted to the electronic column 24.

Figure 5:
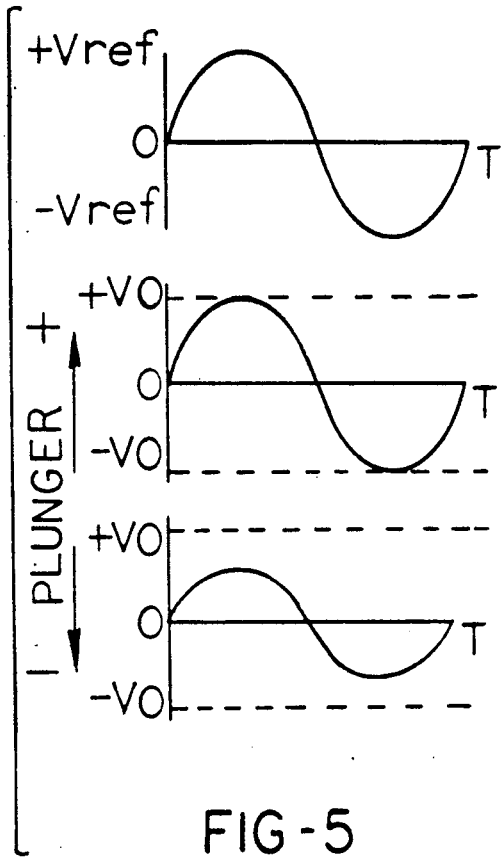
FIGURE 5 is a waveform diagram of a half bridge transducer.

FIG. 5 diagrams the electrical output in the full in (positive) and full out (negative) plunger position. The full in position produces a maximum amplitude output signal in phase with the excitation signal $V_{ref}$, while the full out position produces a minimum amplitude output signal in phase with the excitation signal $V_{ref}$.

Thus, only amplitude is varied with plunger position in the half bridge transducer.

Figure 6:
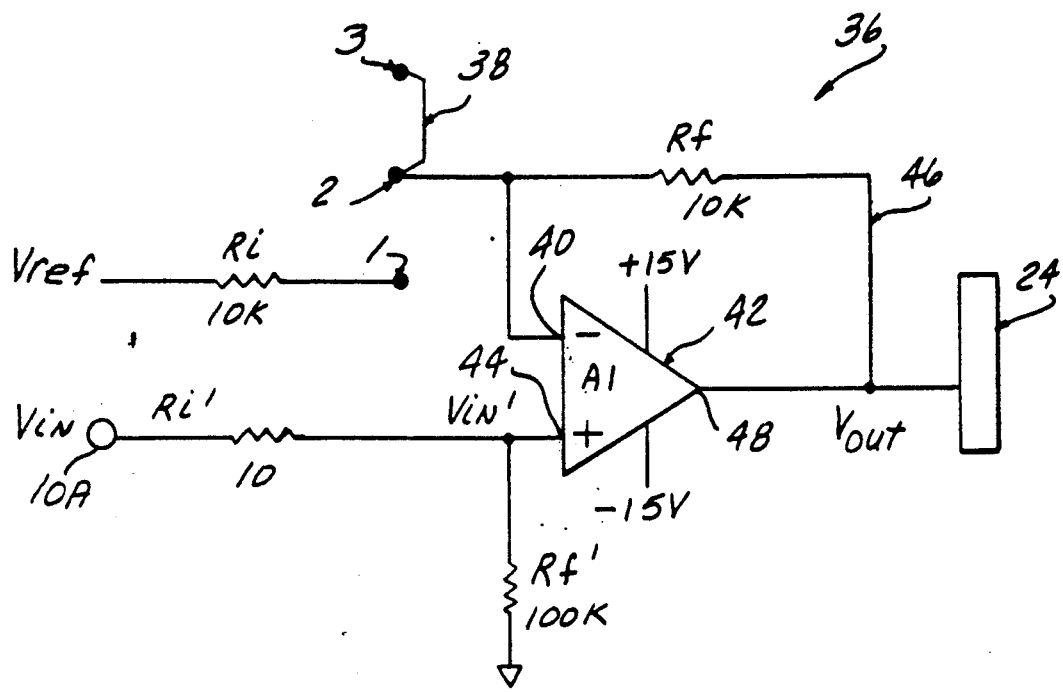
FIG. 6 is a schematic diagram of a conversion circuit according to the present invention, configured to process an LVDT transducer signal without change.
Figure 7:
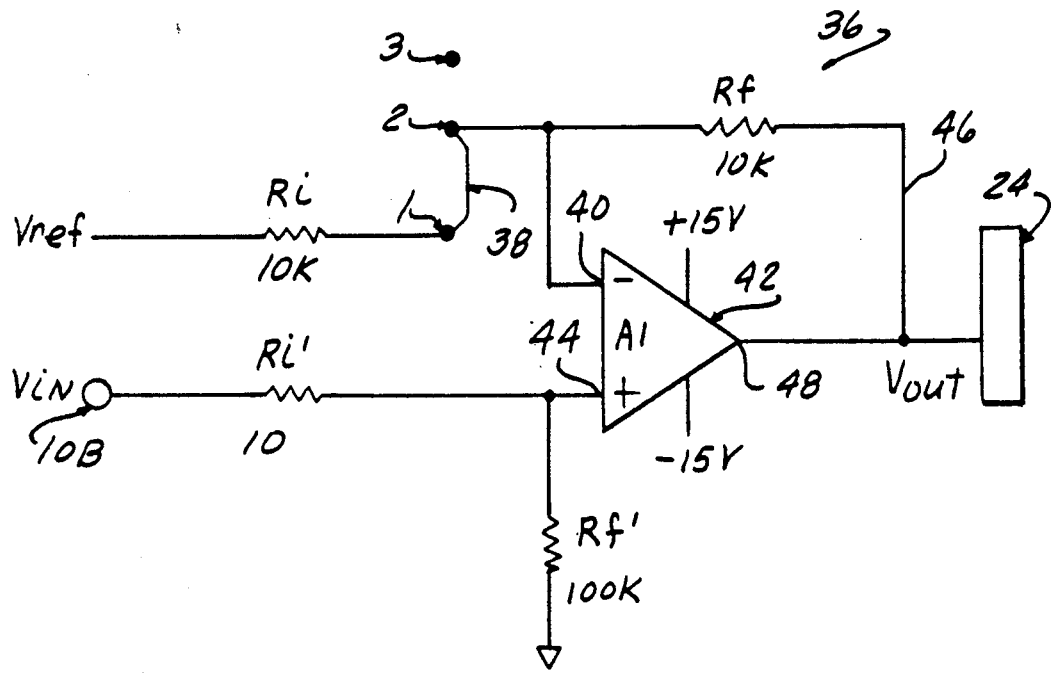
FIGURE 7 is a schematic diagram of the conversion circuit to process a half bridge transducer output signal to correspond exactly to an LVDT transducer output signal.

FIG. 6 shows a signal conversion circuit 36 according to the present invention, preferably built into the electronic column 24 so as to receive the output signal from either LVDT or half bridge transducers 10A, 10B.

The conversion circuit 36 is selectively configured to operate as a unity gain follower when the input signal V in thereto comprises the output signal from the LVDT transducer 10A. In this configuration, a jumper 38 is positioned to connect pins 2 and 3, disconnecting the negative input terminal 40 of an operational amplifier 42 to prevent application thereto of the exciting signal $V_{ref}$ from source 18.

The negative input terminal 40 is connected to a 10 K resistor $R_f$ via feedback line 46 which is also connected to the output terminal 48 of the operational amplifier 42, $V_{out}$ connected to the processing circuitry of a utilization device such as an electronic column 24 mentioned above.

The LVDT transducer 10A output signal is connected to the positive input terminal 44 of the operational amplifier 42 as shown.

With resistors Ri', Rf, and Rf' connected as shown, the circuit 36 operates as a unity gain follower, as can be seen by reference to the following equations:

$$V_{in}' = V_{in} Rf'/(Ri' + Rf')$$

$$V_{in} = V_{in} 100K/(10 + 100K) = 0.999$$

$$V_{in} = V_{in}'$$

$$V_{out} = V_{in}'$$

$$V_{out} = V_{in}$$

With the jumper 38 repositioned on pins 1, 2, the excitation signal $V_{ref}$ from source 18 is applied to the negative input terminal 40. In this configuration the circuit 36 functions as a combining means utilizing a differential amplifier to convert the output from a half bridge transducer 10B to exactly resemble the output of the LVDT transducer 10A. This can be seen from the following equations:

$$V_{in}' = V_{in} (0.999)$$

$$V_{in} \approx V_{in}'$$

$$V_{out} = V_{in}\left(\frac{Rf'}{Ri' + Rf'}\right)\left(\frac{Ri + Rf}{Ri}\right) - V_{ref}\left(\frac{Rf}{Ri}\right)$$

$$V_{out} = V_{in}\left(\frac{100K}{10 + 100K}\right)\left(\frac{10K + 10K}{10K}\right) - V_{ref}\left(\frac{10K}{10K}\right)$$

$$V_{out} = V_{in}/(0.999)(2) - V_{ref}(1)$$

$$\therefore V_{out} = V_{in} - V_{ref}$$

By Definition - (Specific to a Half-Bridge Transducer)

$$V_{in} = V_{ref}/2 \ldots @NULL$$

$$V_{out} = 2 (V_{ref}/2) - V_{ref}$$

$$\therefore V_{out} = 0$$

The function $V_{out} = 2 V_{in} - V_{ref}$ has been found to convert the amplitude only scaled signal of a half bridge transducer 10B, to the amplitude and phase changed signal of the LVDT transducer 10A. The signal for either type of transducer can be processed directly by the circuitry associated with the electronic column 24 or other type of utilization device.

Thus, with only a minor, in the field circuit change, an electronic column 24 can be adapted to either LVDT or half bridge transducers.

I claim:

1. A converter circuit (36) for converting the amplitude only varied output of a half bridge transducer output signal to the amplitude and phase varied output signal of an LVDT transducer output, the half bridge transducer (10B) comprising a pair of in series secondary windings (16A, 16B) juxtaposed to a movable plunger (12) acting as a transformer core, means for applying an exciting AC signal ($V_{ref}$) across said secondary windings (16A, 16B) to generate an output signal ($V_{out}$) at a point intermediate said secondary windings, said converter circuit including connection means for selectively applying said output signal ($V_{out}$) to said converter circuit as $V_{in}$, and said converter circuit including combining means for combining said signal $V_{in}$ with said exciting signal ($V_{ref}$) in said converter circuit to produce a converted output signal $V_{out}$ (converted) according to the following formula:

$$V_{out}(Converted) = 2V_{in} - V_{ref}$$

whereby said converted output signal is amplitude and phase varied with said plunger position corresponding with an LVDT transducer output signal.

2. The converter circuit according to claim 1 wherein said combining means for combining said signals includes a differential amplifier (42), having a negative input terminal (40), said AC exciting signal $V_{ref}$ applied to said negative input terminal (40), said differential amplifier (42) also having a positive input terminal (44) to which is applied said signal $V_{in}$, and said combining means further including a resistance network (Ri, Ri', Rf, Rf') producing said converted output signal $V_{out}$ converted from said combination of signals $V_{ref}$ and $V_{in}$ at an output terminal (48) of said differential amplifier according to said formula.

3. The circuit according to claim 2 wherein said connector means for selectively applying said reference signal $V_{ref}$ includes a movable jumper (38) for selectively connecting and disconnecting application of said excitation signal $V_{ref}$ from said negative input terminal (40), said resistance network and jumper connections to said differential amplifier (42) causing said converter circuit to act as a unity gain follower with said jumper (38) positioned to disconnect application of said excitation signal $V_{ref}$ from said negative input terminal (40).

4. The circuit according to claim 1 in combination with an electronic column so as to apply said converted output signal $V_{out}$ (converted) to said electronic column.

5. A process for converting the amplitude only varied output signal from a half bridge transducer to an amplitude and phase varied output signal said half bridge transducer of the type including a pair of in series secondary windings (16A, 16B) and a juxtaposed movable plunger (12) acting as a transformer core, with an AC excitation signal $V_{ref}$ applied across said secondary windings (16A, 16B) to generate an amplitude scaled output signal $V_{out}$ corresponding to the linear position of said plunger (12) relative said secondary windings (16A, 16B) said signal $V_{out}$ developed at a point intermediate said secondary windings, the process of converting said output signal $V_{out}$ to an amplitude and phase varied output signal of an LVDT transducer, the process comprising the steps of:

combining the output signal $V_{out}$ with the AC excitation signal $V_{ref}$, with the output signal $V_{out}$ applied to a conversion circuit as an input $V_{in}$ to produce a converted output signal $V_{out}$ (converted) according to the formula:

$$V_{out}(converted) = 2V_{in} - V_{ref}$$

6. The process according to claim 5 wherein said step of combining said output signal $V_{out}$ with said excitation signal $V_{ref}$ includes the step of applying said signals to the inputs of a differential amplifier.

* * * * *